(12) United States Patent
Neumann

(10) Patent No.: US 10,890,224 B2
(45) Date of Patent: Jan. 12, 2021

(54) BRAKE LINING FOR A DISC BRAKE, DISC-BRAKE HOLD-DOWN FOR BRAKE LININGS OF A DISC BRAKE

(71) Applicant: BPW Bergische Achsen KG, Wiehl (DE)

(72) Inventor: Arthur Neumann, Morsbach (DE)

(73) Assignee: BPW Bergische Achsen KG, Wiehl (DE)

(*) Notice: Subject to any disclaimer, the term of this patent is extended or adjusted under 35 U.S.C. 154(b) by 212 days.

(21) Appl. No.: 16/065,142

(22) PCT Filed: Dec. 19, 2016

(86) PCT No.: PCT/DE2016/100597
§ 371 (c)(1),
(2) Date: Jun. 22, 2018

(87) PCT Pub. No.: WO2017/108028
PCT Pub. Date: Jun. 29, 2017

(65) Prior Publication Data
US 2019/0056002 A1 Feb. 21, 2019

(30) Foreign Application Priority Data
Dec. 22, 2015 (DE) .................. 10 2015 122 563

(51) Int. Cl.
*F16D 65/095* (2006.01)
*F16D 65/097* (2006.01)
(Continued)

(52) U.S. Cl.
CPC ......... *F16D 65/095* (2013.01); *F16D 55/225* (2013.01); *F16D 55/2255* (2013.01);
(Continued)

(58) Field of Classification Search
CPC .. F16D 65/095; F16D 55/225; F16D 55/2255; F16D 65/097; F16D 65/0978;
(Continued)

(56) References Cited

U.S. PATENT DOCUMENTS

2004/0163903 A1\* 8/2004 Saka .................. F16D 65/0971
188/250 G
2005/0173205 A1 8/2005 Bach et al.
(Continued)

FOREIGN PATENT DOCUMENTS

DE 20 2008 013 446 4/2009
DE 10 2009 023 104 12/2009
(Continued)

*Primary Examiner* — Melanie Torres Williams
(74) *Attorney, Agent, or Firm* — Gudrun E. Huckett

(57) ABSTRACT

A disc brake is proposed having a brake calliper (1) which reaches over a brake disc (2) and brake linings (3) which are arranged on the two sides thereof and are composed in each case of a friction lining (4) and a rear plate (5), and having a hold-down (7) which runs transversely over the brake linings (3) and is supported against the brake linings towards the disc brake axis (A). The circumferential contour of the rear plate (5) of at least one of the brake linings is defined by an upper edge (21), a lower edge (22) and two side edges (23A, 23B) which extend between the upper and the lower edge. The circumferential contour of the friction lining (4) is also defined by an upper edge (31), a lower edge and two side edges which extend between the upper and the lower edge. In order to make a contribution to the solution of the problem of the structural tightness between the components of the disc brake and the vehicle wheel which rotates around the brake, the main course of the upper edges (21 and 31) of the rear plate (5) and the friction lining (4) where the hold-down (7) runs over the brake lining (3) is interrupted by a recessed portion (25 and 35) of the upper edge (21 and 31) in the direction of the brake disc axis (A).

31 Claims, 8 Drawing Sheets

(51) Int. Cl.
*F16D 55/2255* (2006.01)
*F16D 55/225* (2006.01)
*F16D 55/00* (2006.01)

(52) U.S. Cl.
CPC ....... *F16D 65/097* (2013.01); *F16D 65/0978* (2013.01); *F16D 2055/0016* (2013.01); *F16D 2200/0004* (2013.01); *F16D 2200/0021* (2013.01); *F16D 2250/0084* (2013.01)

(58) Field of Classification Search
CPC ..... F16D 2055/0016; F16D 2200/0004; F16D 2200/0021; F16D 2250/0084
See application file for complete search history.

(56) References Cited

U.S. PATENT DOCUMENTS

2014/0284152 A1\* 9/2014 Moeller ................ F16D 65/095
188/73.31
2015/0068853 A1\* 3/2015 Naito .................... F16D 55/228
188/72.4
2015/0122597 A1\* 5/2015 Shimamura ........... F16D 65/092
188/72.4
2015/0184710 A1 7/2015 Peschel et al.
2015/0362028 A1 12/2015 Sander et al.
2017/0138427 A1\* 5/2017 Schoenauer .......... F16D 55/226
2018/0094682 A1\* 4/2018 Satoh .................... F16D 65/095

FOREIGN PATENT DOCUMENTS

| | | |
|---|---|---|
| DE | 10 2012 013 526 | 1/2014 |
| DE | 10 2012 108 667 | 3/2014 |
| DE | 10 2015 000 857 | 8/2015 |
| EP | 1 898 115 | 3/2008 |
| EP | 2 574 812 | 4/2013 |
| WO | 2007/068464 | 6/2007 |
| WO | 2007/072510 | 6/2007 |
| WO | 2015/155708 | 10/2015 |
| WO | 2016/034378 | 3/2016 |

\* cited by examiner

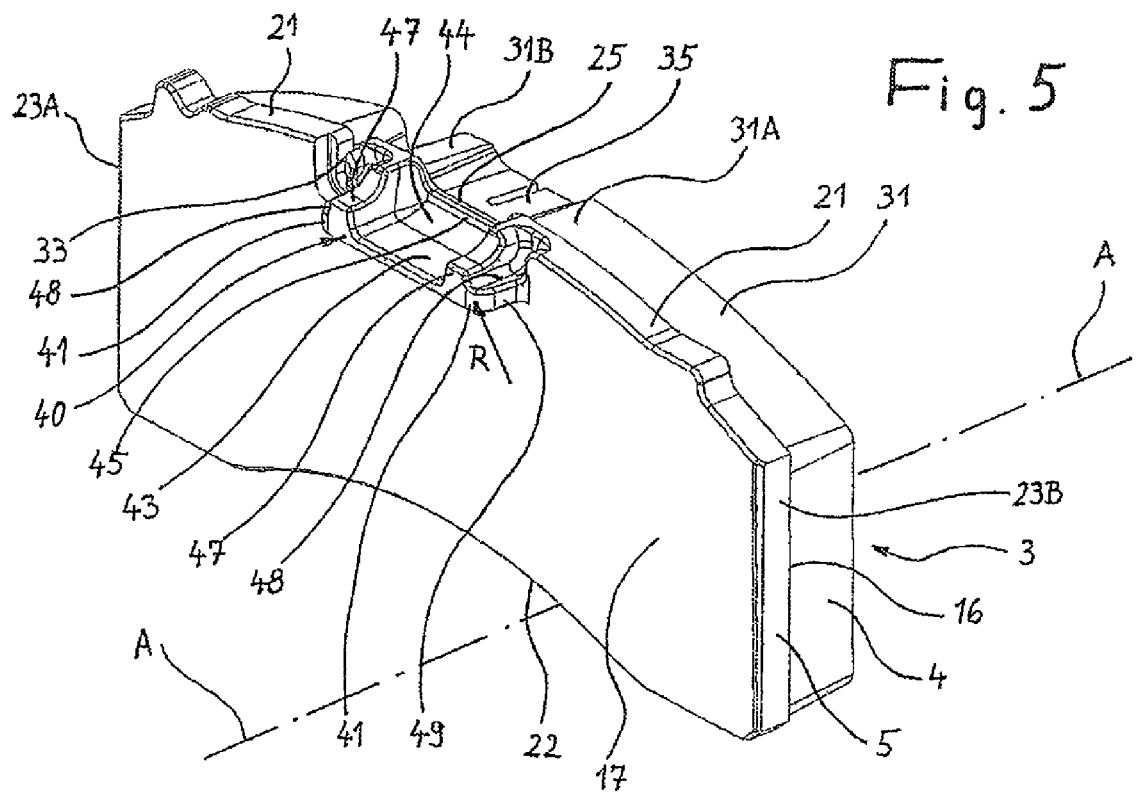
Fig. 5
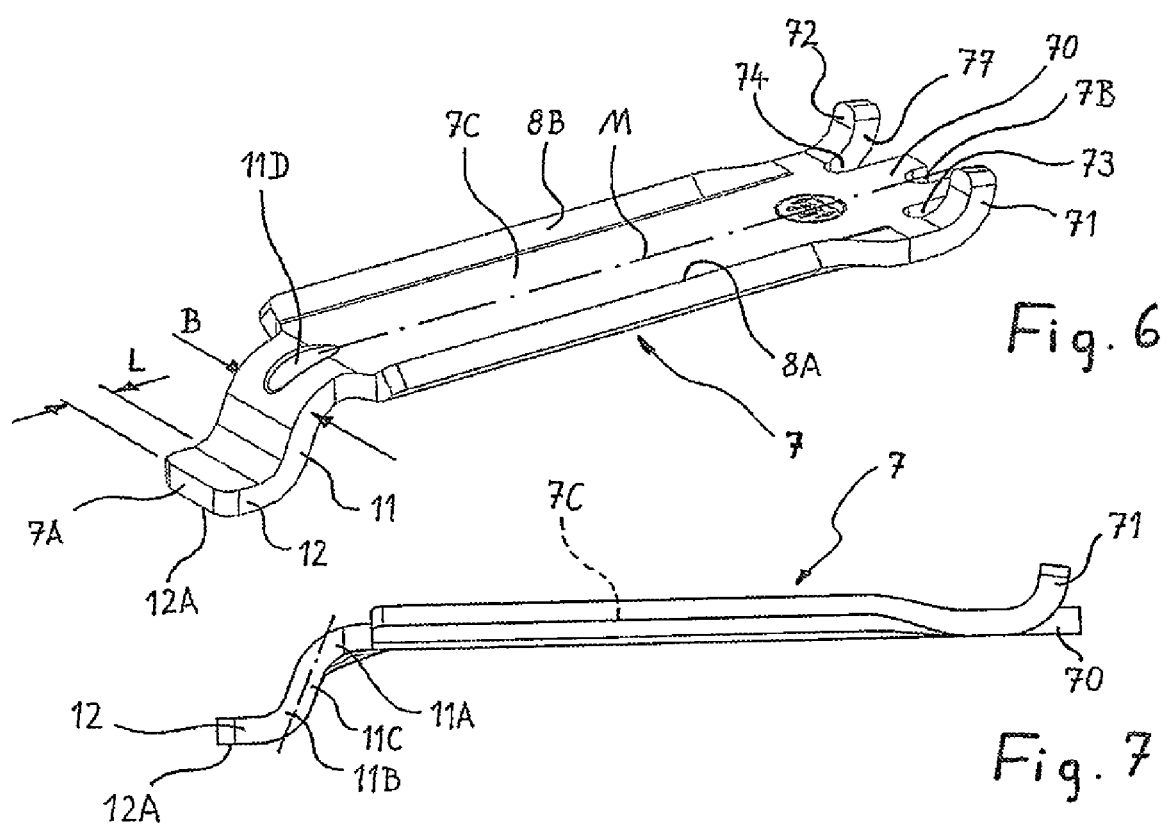
Fig. 6
Fig. 7

BRAKE LINING FOR A DISC BRAKE, DISC-BRAKE HOLD-DOWN FOR BRAKE LININGS OF A DISC BRAKE

BACKGROUND OF THE INVENTION

The invention relates to a brake pad for a disk brake that is composed of a friction pad, which is designed to make contact with the brake disk of the disk brake, and of a backplate, the front side of which is formed as a fastening surface for the friction pad and the rear side of which is formed as a pressure surface for the transmission of the brake pressure, wherein the circumferential contour of the backplate is defined by an upper margin, a lower margin and two side margins extending between the upper and the lower margin, and also the circumferential contour of the friction pad is defined by an upper margin, a lower margin and two side margins extending between the upper and the lower margin. The invention further relates to a brake pad composed of a friction pad, which is designed to make contact with the brake disk of the disk brake, and of a backplate, the front side of which is formed as a fastening surface for the friction pad and the rear side of which is formed as a pressure surface for the transmission of the brake pressure and the circumferential contour of which is defined by an upper margin, which runs in predominantly circular-arc-shaped fashion, a lower margin, and two side margins extending between the upper and the lower margin. The invention relates further to a disk brake equipped with a brake pad of said type, the disc brake having a brake caliper which engages over a brake disk and over brake pads arranged to both sides of said brake disk, which brake pads are each composed of a friction pad and of a backplate, and having a hold-down means which leads transversely across the brake pads and which is supported, in the direction of the disk brake axis, against the brake pads, wherein the circumferential contour of the backplate of at least one of the brake pads is defined by an upper margin, a lower margin and two side margins extending between the upper and the lower margin, and also the circumferential contour of the friction pad is defined by an upper margin, a lower margin and two side margins extending between the upper and the lower margin. The invention also relates to a disc brake having a brake caliper which engages over a brake disk and over brake pads arranged to both sides of said brake disk, which brake pads are each composed of a friction pad and of a backplate, and having a hold-down means which leads transversely across the brake pads and which is supported, in the direction of the disk brake axis, against the brake pads, wherein the circumferential contour of the backplate of at least one of the brake pads is defined by an upper margin, which runs in predominantly circular-arc-shaped fashion, a lower margin, and two side margins extending between the upper and the lower margin The invention also relates to a hold-down means for the fastening of brake pads in a disk brake, having a longitudinal extent and having a width which is much smaller in relation to said longitudinal extent, wherein the hold-down means is formed, over the predominant part of its overall length, as a flat base adjoined by side flanks arranged at an angle with respect to said base, and has, over another part of its overall length, an end region with a different cross-sectional form.

EP 1 898 115 B1 has disclosed a disk brake having a brake caliper which engages over a brake disk and over brake pads arranged to both sides of said brake disk. Said brake pads are each composed of a friction pad and of a backplate. A hold-down means in the form of a rigid bracket extends transversely with respect to the brake pads and is supported, in the direction of the disk brake axis, against the brake pads. For the purposes of adaptation to the circular circumferential contour of the brake disk, the circumferential contour of the backplate of the brake pad is defined by an upper or outer margin which runs predominantly in circular-arc-shaped fashion, by a lower or inner margin, and by two side margins extending between the upper and the lower margin. Via the latter, the braking forces or braking torques are transmitted from the brake pad to the brake caliper or a brake carrier of the disk brake.

For a space-saving arrangement, disk brakes are normally arranged as far to the outside of the vehicle as possible, wherein parts of the disk brake are even situated within the braked vehicle wheel. It is at the same time sought, in order to achieve a high level of braking power, for the brake disk of the disk brake to be dimensioned to be as large as possible. This desire however has the result that only little clearance remains between the components of the disk brake and the vehicle wheel rotating around the brake. It is therefore not uncommon, when additional bending loads arise, for brake parts situated radially far to the outside to grind against the rotating inner surface of the vehicle wheel.

DE 10 2012 013 526 A1 has also disclosed a brake pad for a disk brake, in the case of which the circumferential contour of the friction pad is defined by an upper margin, by a lower margin and by two side margins. The upper margin of the friction pad has a circular-arc-shaped main profile, wherein said main profile is interrupted, in the center between the two side margins, by a depression of the upper margin in the direction of the lower margin. The backplate of the friction pad does not have a similar interruption of its upper marginal contour. It is the object of the invention to contribute to a solution to the problem of the structural constriction between the components of the disk brake and the vehicle wheel rotating around the brake.

SUMMARY OF THE INVENTION

Such a contribution to a solution is made by a brake pad for a disk brake that is characterized in that the upper margins of the backplate and of the friction pad each have a main profile which is interrupted, in the center between the two side margins of the backplate, by a depression of the upper margin in the direction of the lower margin of the backplate, or that is characterized in that the circular arc shape of the upper margin is interrupted, in the center between the two side margins, by a depression of the upper margin in the direction of the lower margin.

Said brake pad is composed of a friction pad, which is designed to make contact with the brake disk of the disk brake, and of a backplate, the front side of which is formed as a fastening surface for the friction pad and the rear side of which is formed as a pressure surface for the transmission of the brake pressure. The circumferential contour of the backplate is defined by an upper margin, which follows a main profile, a lower margin and two side margins extending between the upper and the lower margin. Here, the main profile of the upper margin is interrupted, in the center between the two side margins, by a depression of said upper margin in the direction of the lower margin. A clearance is realized by means of the depression. When the brake pad is inserted into the pad channel of a disk brake, the clearance offers space for the crossing of a hold-down means which extends across the brake pad and which is supported, in the direction of the disk brake, against the brake pad. In this way, the hold-down means, at least over a part of its length, assumes a position less far radially to the outside, whereby the risk of brake parts grinding against the inside of the rotating vehicle wheel, such as arises owing to the structural constriction between the components of the disk brake and the vehicle wheel rotating around the brake, is reduced.

A contribution to a solution to the stated problem is furthermore made by a disk brake characterized in that the main profile of the upper margins of the backplate and of the friction pad is interrupted, where the hold-down means leads across the brake pad, by a depression of the upper margin in the direction of the disk brake axis, or characterized in that the circular arc shape of the upper margin of the backplate is interrupted, where the hold-down means leads across the brake pad, by a depression of the upper margin in the direction of the disk brake axis having.

Said disk brake is equipped with a brake caliper which engages over a brake disk and over brake pads arranged to both sides of said brake disk, which brake pads are each composed of a friction pad and of a backplate, and with a rigid hold-down means which leads transversely across the brake pads and which is supported, in the direction of the disk brake axis, directly against at least one of the brake pads. The circumferential contour of the backplate of at least one of the brake pads is defined by an upper margin, which predominantly follows a main profile, a lower margin and two side margins extending between the upper and the lower margin. The main profile of the upper margin of the backplate is interrupted, where the hold-down means leads across the back plate, by a depression of the upper margin in the direction of the disk brake axis.

Contribution to a solution is also made by a hold-down means. In the case of said hold-down means, the end region of the hold-down means is formed by an S-shaped cranked portion and by a straight longitudinal section adjoining the cranked portion. Said longitudinal section has a bearing surface which runs parallel to and spaced apart from the base.

Advantageous refinements of the brake pad, of the disk brake and of the hold-down means are specified in the respective dependent claims. These refinements also make a contribution to a solution to the problem of the structural constriction between the brake parts of the disk brake and the vehicle wheel rotating around the brake.

BRIEF DESCRIPTION OF THE DRAWINGS

Exemplary embodiments will be discussed in more detail below on the basis of the drawings, in which:

FIG. 5 is a perspective illustration of only the brake pad with the backplate facing toward the viewer;

FIG. 6 is a perspective illustration of only the hold-down means, used on the brake caliper, of the hold-down means arrangement;

FIG. 7 shows the hold-down means in a side view;

DESCRIPTION OF PREFERRED EMBODIMENTS

Figure 1:
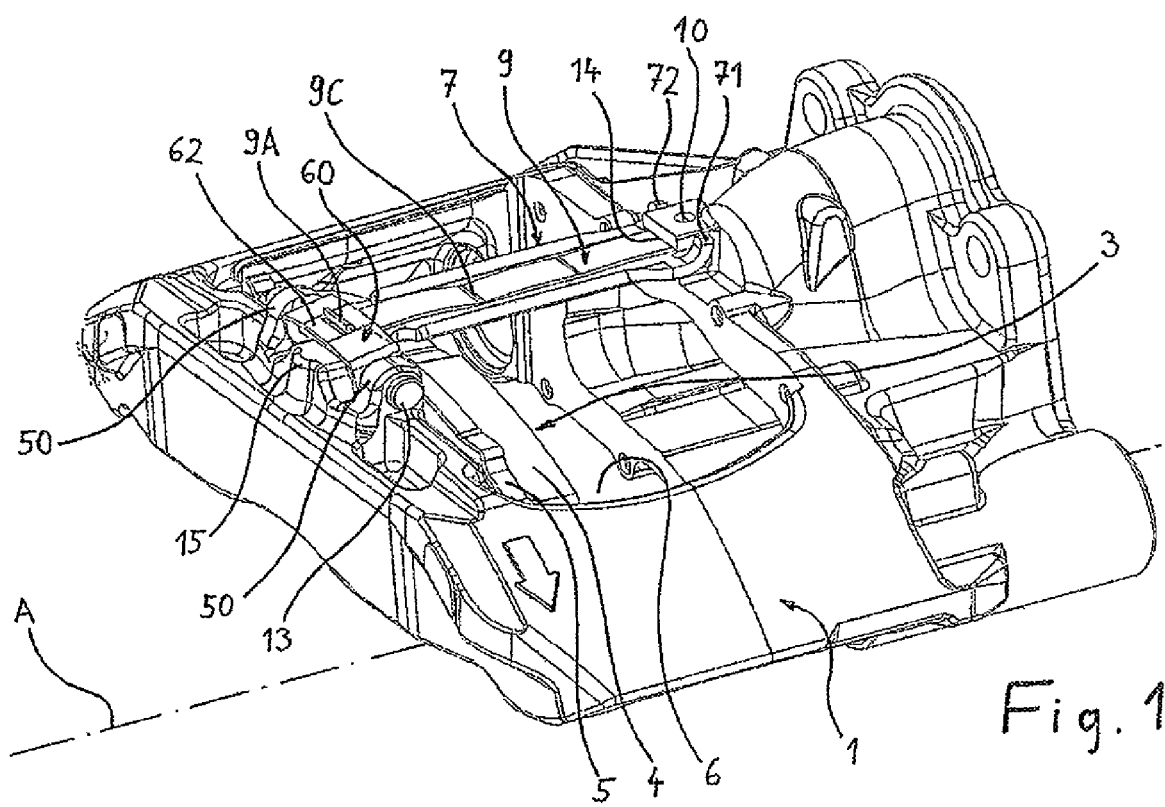
FIG. 1 is a perspective illustration of the brake caliper of a vehicle disk brake including the pad channel formed in the brake caliper, with a brake pad arranged in said pad channel, and a hold-down means arrangement over the pad channel.
Figure 2:
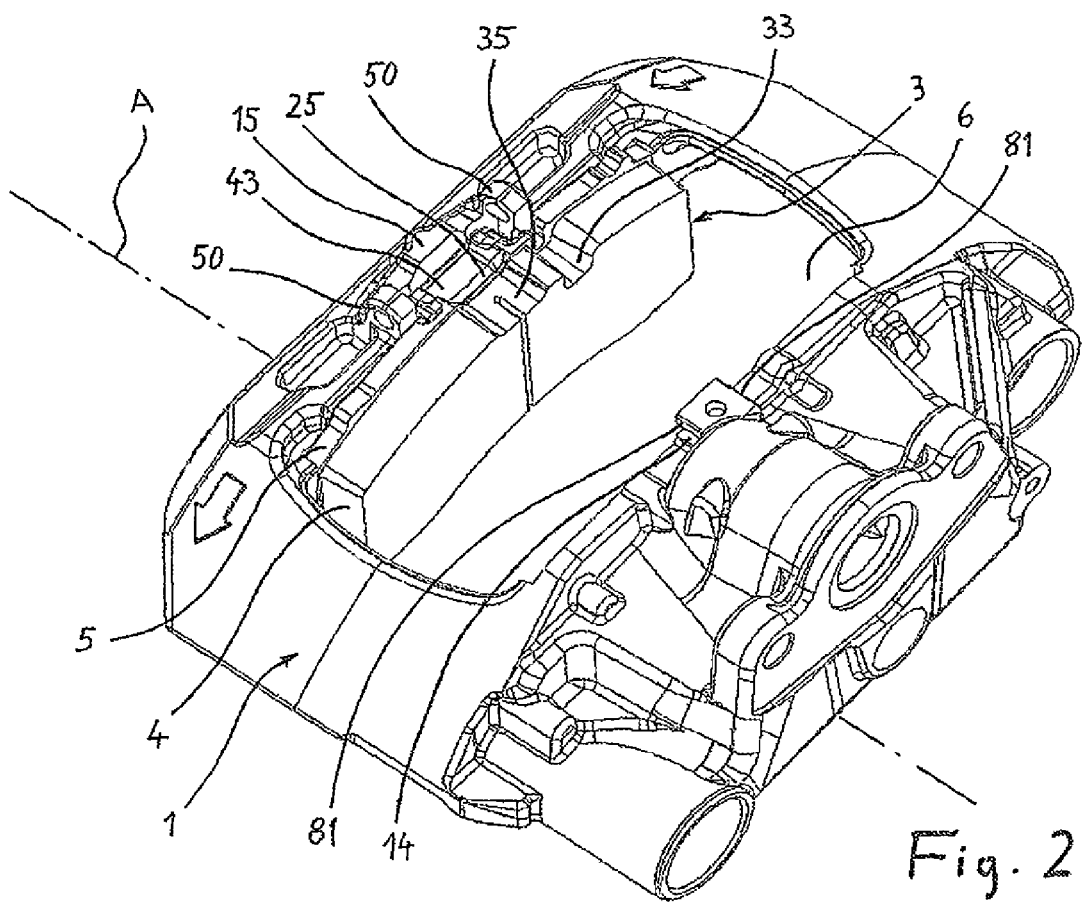
FIG. 2 shows the subject matter of FIG. 1 in another perspective illustration, but without all of the parts of the hold-down means arrangement that is depicted in full in FIG. 1.

FIGS. 1-3 show the central part of the brake caliper 1 of a vehicle disk brake for utility vehicles. The disk brake may be of floating caliper type or of fixed caliper type. In each case one brake pad is arranged to each side of the brake disk, which is depicted only by way of its axis of rotation A. To receive the brake pads, the brake caliper 1 is equipped with a pad channel 6, across which a pad hold-down means 7 extends. The pad hold-down means 7 bridges the pad channel 6 such that the pad hold-down means 7 extends transversely across both brake pads, wherein, in the figures, only the brake pad 3 arranged at the outside of the vehicle is illustrated, but not the second brake pad arranged at the inside of the vehicle, which may be of identical or different form.

The brake pad 3 is composed, as is conventional, of the friction pad 4 itself and of a backplate 5. The backplate 5 is preferably composed of cast metal. The backplate 5 serves for the improved distribution of the brake pressure over the pad area. Said backplate furthermore performs the guidance and the support of the brake pad either on the brake caliper 1 itself or on a brake carrier fixed with respect to the axle.

The pad hold-down means 7 shown as an individual part in FIGS. 6 and 7 is of elongate form along its central line M and extends, over the major part of its length, parallel to the axis of rotation A of the brake disk. Its end depicted on the right, and at the inside of the vehicle, is fastened directly to the brake caliper 1, for which purpose said end of the hold-down means 7 is seated in a recess 14 (FIG. 3a) of the brake caliper 1. The other end, depicted on the left, of the hold-down day means 7 is fastened only indirectly to the brake caliper 1, as will be discussed in more detail further below.

To secure the two brake pads in the pad channel 6, the hold-down means 7 is in the form of a rigid holding bracket, and is combined with a resiliently elastic leaf spring 9 to form a hold-down means arrangement. It is an object of the hold-down means arrangement to fix the two brake pads relative to the pad channel 6 such that the brake pads cannot emerge or fall out of the pad channel 6 in a radially outward direction in relation to the axis of rotation A of the brake disk.

The hold-down means 7 is, over the predominant part of its overall length, of channel-shaped cross section with a base 7C arranged on the longitudinal central line M of the hold-down means, which base is adjoined, along the two longitudinal edges of the base, by side flanks 8A, 8B, which reinforce said central longitudinal section of the hold-down means with respect to bending forces.

With the side flanks 8A, 8B, the hold-down means can be supported on the margin of the brake pad situated at the inside (not illustrated in the drawing). For this purpose, it may be advantageous for the flanks 8A, 8B to have the form of rising slopes. In this case, the hold-down means 7 has, over the major part of its length, an approximately trapezoidal cross section, and in this case in particular has the cross section of a trapezoidal channel.

The flat bottom of the channel, which is formed by the base 7C and which has approximately the width of the leaf spring 9, is adjoined to both sides by the side flanks 8A, 8B at an angle of between 15° and 90°, preferably at an angle of 20°.

The leaf spring 9, which is composed of a spring steel, likewise extends on the longitudinal central line M. Said leaf spring is fastened by means of one spring end thereof in a first spring bearing and is fastened by means of the other spring end thereof in a second spring counterbearing. The two fastenings are detachable in order to remove the spring 9 and the pad hold-down means 7 arranged therebelow, and in order to access the pad channel 6 from the outside for the purposes of exchanging the brake pads.

The leaf spring 9 extends on the outer side of the hold-down means 7, longitudinally with respect to the latter, and is supported from the outside against the hold-down means 7, whereby the latter is spring-loaded toward the two brake pads. The hold-down means 7, despite itself being rigid, is thus supported against the two brake pads under permanent spring force, and acts on these in each case with a force directed toward the axis of rotation A.

The leaf spring 9 is supported only with a very short longitudinal section at the outside on the pad hold-down means 7. Over this short longitudinal section, which is situated on a central section of the leaf spring 9 and across the pad channel 6, the leaf spring is provided with a bend or a kink 9C, which extends transversely with respect to the longitudinal extent of the leaf spring 9. It is only with the outer side of said bend or said kink 9C that the leaf spring 9 bears against the hold-down means 7. It is thus only at the location of this discrete contact that the hold-down means 7 is acted on with the spring force in the direction of the brake pads 3.

A first spring counterbearing for the leaf spring 9 is situated adjacent to the pad channel 6 toward the outside of the vehicle, and a second spring counterbearing is situated on the brake caliper 1 toward the inside of the vehicle. The spring counterbearing toward the outside of the vehicle has a bolt 13 for the fixing of the respective end 9A of the leaf spring 9. By contrast, to form the second spring counterbearing, the brake caliper 1 is equipped with the recess 14, which is open towards the pad channel 6 and which has the form of a slot. Said slot provides space both for the local end of the hold-down means 7 and for the local end of the leaf spring 9.

For the installation of the arrangement composed of hold-down means 7 and leaf spring 9, it may be advantageous if the ends of said two components, which ends are inserted jointly into the slot-like recess 14 of the brake caliper 1, are locked together in a longitudinal direction. For this purpose, the hold-down means 7 is equipped at this end with an end face, in which a recess 7B may be situated (FIG. 6). The recess 7B is then engaged into by a positive-locking element formed on the corresponding end of the leaf spring 9. This form of longitudinal locking of the leaf spring 9 has the result that, as soon as the hold-down means 7 is situated in the opening or recess 14 of the brake caliper 1, the leaf spring 9 is locked in the longitudinal direction, specifically is captively held axially on the hold-down means 7. This measure serves for security and facilitates the subsequent fixing of the hold-down means 7 and in particular of the leaf spring 9 at the other end, that is to say in the region of the spring counterbearing situated toward the outside of the vehicle (illustrated on the left).

Alternatively, secure provisional longitudinal locking of the leaf spring 9 can also be achieved by virtue of said leaf spring engaging, with a positive-locking element formed on the end of the leaf spring 9 facing toward the inside of the vehicle, into an opening 10 situated directly in the brake caliper 1. Here, the opening 10 is a bore formed transversely with respect to the slot 14 in the brake caliper.

In order, with regard to the hold-down means 7, to contribute to reducing the structural constriction between the rotating vehicle wheel and the non-rotating brake parts, the hold-down means is designed in a special manner at its end situated toward the outside of the vehicle, as will be discussed in more detail below.

In FIGS. 6 and 7, the hold-down means 7 is designed so as to be narrower at its end section situated toward the outside of the vehicle, with a width B, than over the relatively long longitudinal section in the form of a channel. The width B is uniform in said end section, and is no greater than the width of the base 7C. In particular, over this relatively short longitudinal section, the hold-down means 7 is equipped with a cranked portion 11 which adjoins the elongate base 7C, by virtue of the hold-down means 7 having, proceeding from the base 7C, firstly a first bend 11A downward, and adjoining this, a second bend 11B as an opposing bend. The second bend 11B is adjoined, as an end of the hold-down means 7 situated toward the outside of the vehicle, directly by a straight longitudinal section 12. The straight longitudinal section 12 is thus situated lower, or closer to the axis of rotation A, than the base 7C of the channel-like longitudinal section.

The S-shaped cranked portion 11 is preferably designed such that its second bend 11B, which transitions directly into the straight end section 12, does not directly adjoin the first bend 11A, with a short, straight-running section 11C rather being situated in between. The angle thereof with respect to the channel-like longitudinal section is 110°.

The longitudinal section 12 extends with a length L substantially parallel to the axis of rotation A and so as to be parallel and offset with respect to the considerably longer, channel-like longitudinal section. In the exemplary embodiment, in which the hold-down means 7 has an overall length of approximately 150 mm, the end section 12 runs so as to be offset with respect to the base 7C of the channel-like section by 15 to 20 mm.

The region of the cranked portion 11 may be reinforced by means of one or more stiffening beads 11D, because here, the hold-down means 7 is relatively slim, with the width B, and bending forces can arise. The hold-down means 7 is preferably composed of punched and deformed steel sheet with a material thickness of at least 4 mm.

When the bolt 13 is in an installed state, it is engaged under by the cranked portion 11, or by the longitudinal section 12 that forms the end of the hold-down means 7, without making contact therewith. Said end region of the hold-down means is nevertheless captively held by the bolt 13 arranged thereabove, such that said end region cannot under any circumstances become released outward from the brake channel 6. The cranked portion 11 or the end section 12 of the hold-down means 7 have, in the installed state, such a spacing to the bolt 13 in terms of height that no contact occurs.

The hold-down means 7 lies on the backplates 5 of both brake pads from above, and, there, is initially movable only in its longitudinal direction but held fixed transversely with respect thereto by means of lateral shaped elements of the brake pads. The two brake pads are freely movable in the pad channel 6 in the direction of the axis of rotation of the brake disk A and are guided with a certain degree of play in the circumferential direction of the brake disk. This combination of freedoms of movement has the effect that the hold-down means 7 is mounted on the brake pads 3 freely in its longitudinal extent and, transversely, so as to be movable, or in floating fashion, to a restricted extent with the brake pads 3. The movement in its longitudinal extent is, in the installed state, tightly limited by respective stops on the brake caliper 1. For this purpose, the stop surfaces between which the hold-down means 7 can move are mechanically worked, for example by milling of the brake caliper 1.

In a longitudinal direction of the hold-down means 7, a projection 15 formed integrally on the brake caliper 1 is situated opposite the end section 12 of said hold-down means with a small spacing. The projection 15 thus forms a stop which limits the longitudinal mobility of the hold-down means 7 toward the outside of the vehicle.

The projection 15 preferably extends to close to the circumference of the bolt 13, but without making contact with the bolt 13.

Two bearing blocks 50 formed integrally on the brake caliper 1 have in each case one bore in which the bolt 13 is seated on the axis 13A. In order that the bolt 13 cannot become released from the bearing blocks 50 and thus from the caliper in the bolt longitudinal direction, suitable securing rings, splints or the like are provided on the bolt 13.

Figure 3A:
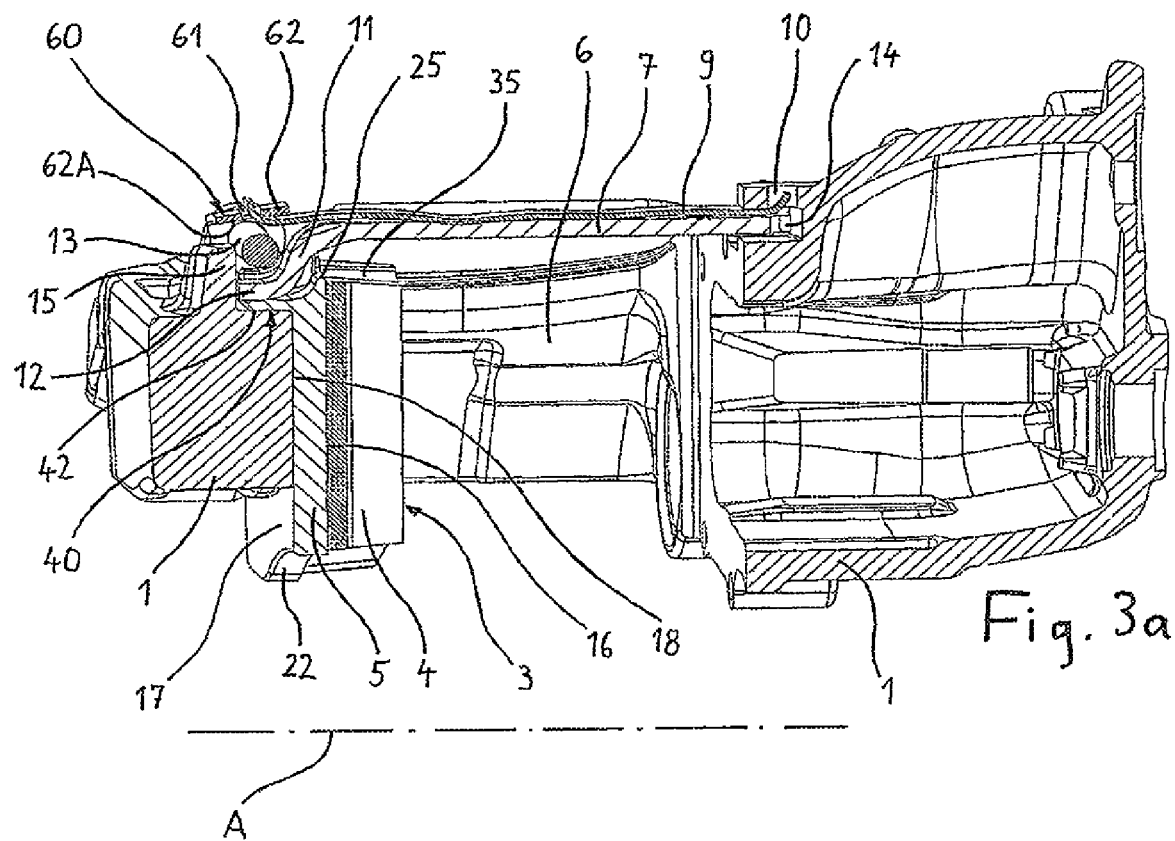
FIG. 3a shows the subject matter of FIG. 1 in a centrally applied longitudinal section through the caliper.
Figure 3B:
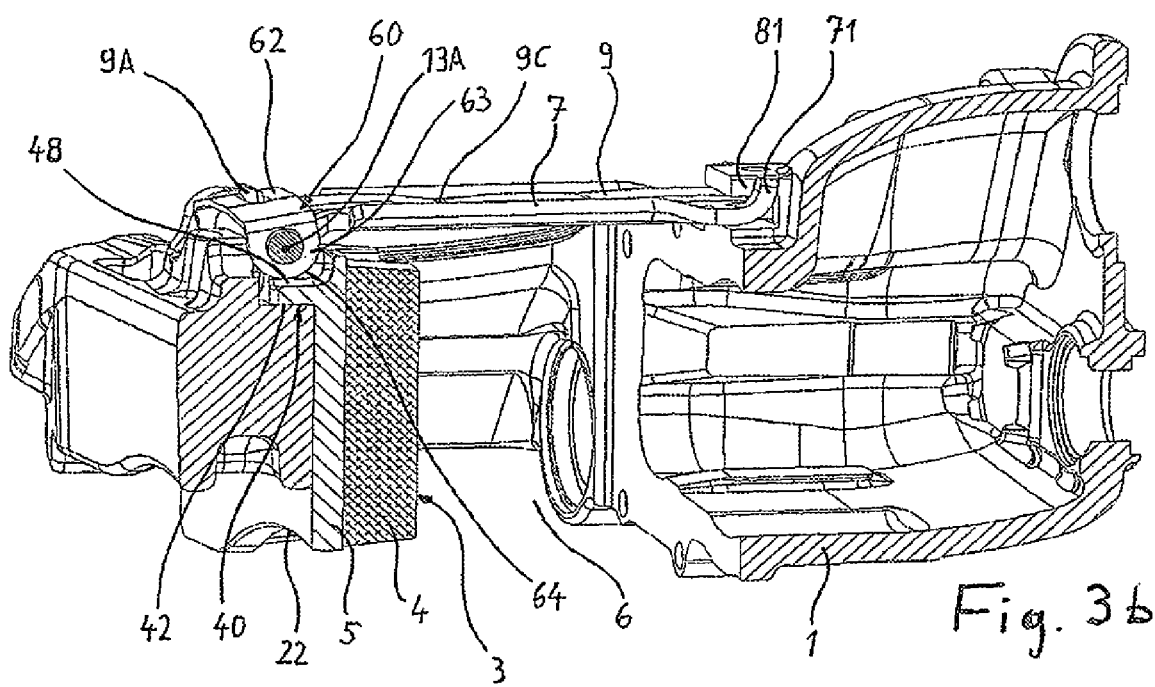
FIG. 3b shows the subject matter of FIG. 1 in a different, in this case eccentrically applied longitudinal section through the caliper.
Figure 3C:
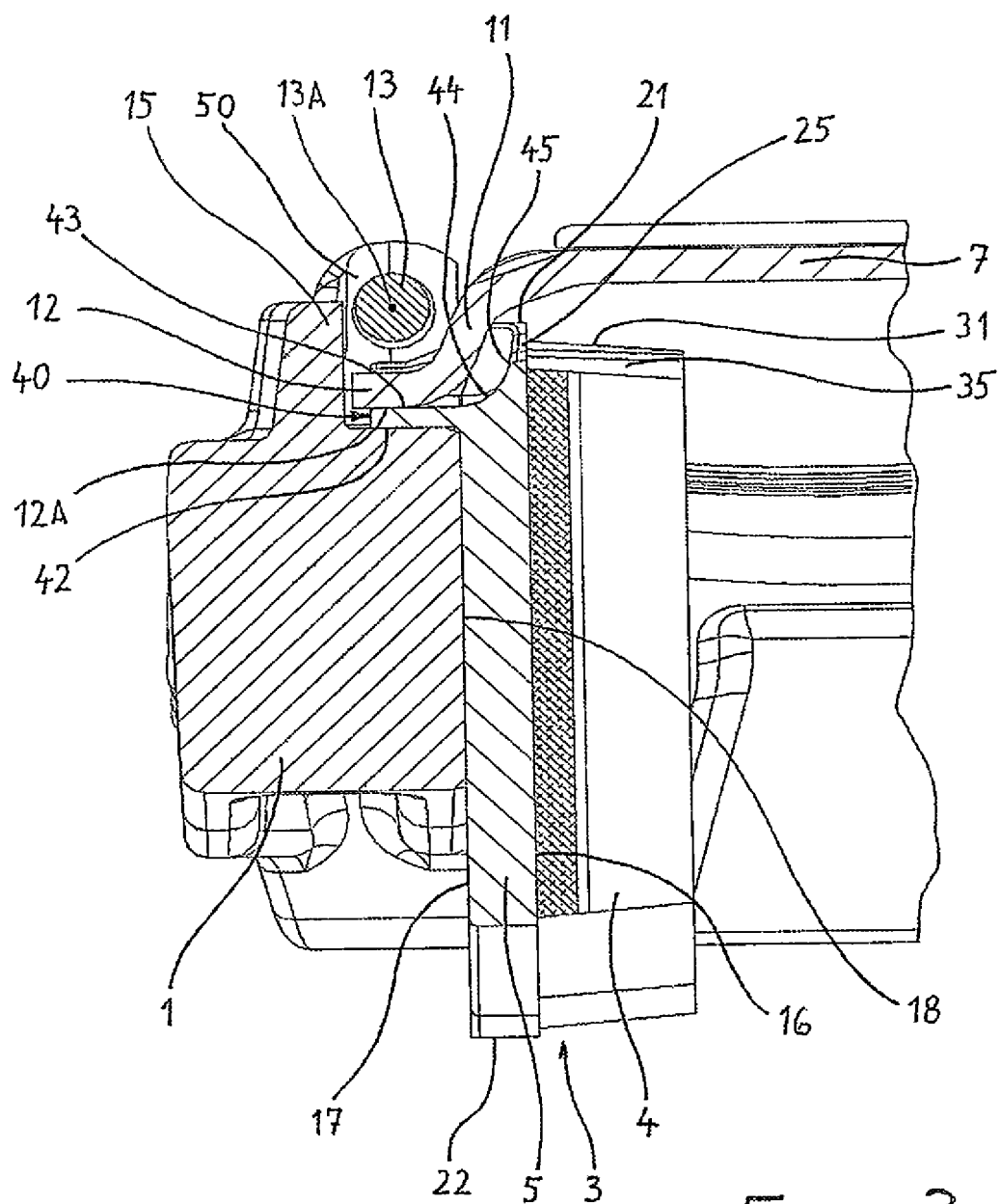
FIG. 3c shows the left-hand region of FIG. 3a on an enlarged scale.

FIGS. 3*a*-3*c* and in this case in particular FIG. 3*b* show details of the fixing of the end 9A, situated toward the outside of the vehicle, of the leaf spring 9 to the counterbearing. A constituent part of this spring counterbearing is, in addition to the bolt 13, a fastening bracket 60 which is connected by means of the bolt 13, so as to be pivotable about the bolt axis 13A, to the brake caliper 1. The leaf spring 9 is supported by means of its spring end 9A against the inner side or underside, facing toward the axis 13A, of the bracket 60. It may additionally be advantageous if a positive-locking element formed on said spring end 9A engages into a slot-like opening 61 in the bracket 60, and thereby arrests the pivoting position of the bracket 60.

Figure 8:
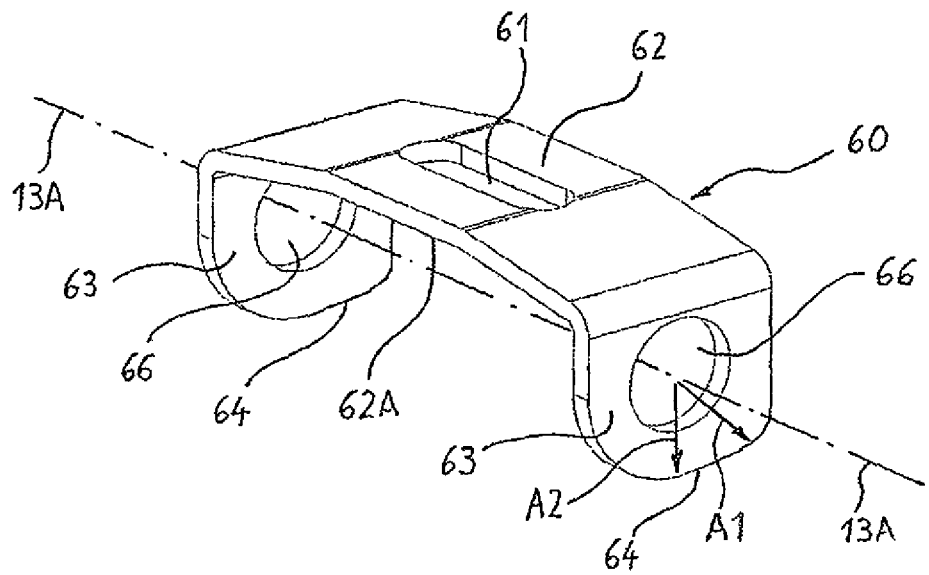
FIG. 8 is a perspective illustration of only the bracket used on the brake caliper, which simultaneously serves as a counterbearing element and as a blocking element.

The bracket 60, illustrated as an individual part in FIG. 8, is the counterbearing element, situated toward the outside of the vehicle, for the leaf spring 9. The bracket 60 is composed of a central section 62, which is parallel to the axis 13A and on which the opening 61 may be situated, and two side sections 63, which are arranged approximately at right angles in relation to the central section 62. Said side sections are formed as lugs 63 and are equipped in each case with a circular opening 66 arranged on the axis 13A. By virtue of the fact that the two openings 66 are aligned with one another on the axis 13A, the axis 13A is simultaneously the alignment axis of the two openings 66. The bolt 13 passes through both openings simultaneously.

That margin of the lugs 63 which faces toward the disk brake axis of rotation A has a marginal contour 64 which is curved toward the axis 13A. That contour section of the contour 64 which faces toward the disk brake axis A forms a stop, because the contour profile is such that the contour 64 partially has a relatively large spacing A1, and partially has a relatively small spacing A2, to the axis 13A. For example, the contour 64 may be of eccentric shape, or may have a circular arc shape, but then with an offset with respect to the axis 13A.

The bolt 13 is the fastening means for the detachable fastening of the bracket 60, which serves as counterbearing element and as blocking element, to the brake caliper 1. At the same time, the end 9A of the leaf spring 9 bears under spring load against the inner side, facing toward the bolt 13, of the central section 62. Said inner side is therefore the counterbearing 62A on which the spring 9 is supported by way of its spring end. The sum of these measures leads to the bending stress in the leaf spring 9 being ensured and maintained.

An additional securing measure may be the positively locking engagement of an angled positive-locking element, which is additionally formed on the spring end 9A, into the opening 61 of the bracket 60. For this purpose, the spring 9 may be bent upward at said spring end, such that the outer side of said bend faces toward the bolt axis 13A.

The installation of the arrangement composed of pad hold-down means 7, leaf spring 9, bolt 13 and bracket 60 as counterbearing element and blocking element is performed in that, firstly, the leaf spring 9 is placed with its other end onto the hold-down means 7 such that said leaf spring engages behind that end of the hold-down means 7 which is situated toward the inside of the vehicle. Then, the parts hold-down means and leaf spring, thus provisionally connected to one another, are inserted in a longitudinal direction into the recess 14 in the brake caliper 1.

In a next step, the bracket 60 is placed onto the other spring end 9A, which can be facilitated by the engagement of the positive-locking element into the opening 61 of the bracket 60, and is thus made more reliable for the technician. The end 9A of the spring 9 is in this case supported on the counterbearing 62A at the inside on the bracket 60. Then, only the bracket 60 is moved downward by manual exertion of pressure, and with bending of the leaf spring, until the bolt 13 can be inserted along the axis 13A into the bearing blocks 50. Then, the exertion of pressure on the bracket 60 can be withdrawn, because the bracing force of the leaf spring 9 is now reliably absorbed by the bracket 60, which forms the counterbearing element, in conjunction with the bolt 13.

Radially to the outside, the leaf spring 9 holds the hold-down means 7 on the brake pads 3 with spring preload force, and ensures that, in the event of a relatively intense shock, for example as a result of driving over a pothole, the brake pad 3, which lifts off in a radially outward direction, is pushed back into its original position. If, for example as a result of mechanical influences, the leaf spring 9 breaks and thus loses its holding function, the hold-down means 7 is, by means of the bracket 60 arranged thereabove and the recess 14, still held securely enough that the brake pads cannot be lost.

The cranked portion 11, depicted in FIG. 6 and FIG. 7, of the relatively narrow longitudinal section of the hold-down means 7 situated on the brake disk side situated toward the outside of the vehicle has the advantage that, in this region, disk brake parts project radially outward to a relatively small extent, and thus a contribution is made to alleviating the structural constriction with respect to the surrounding vehicle wheel that rotates around the brake. However, the cranked portion 11 leads to a space requirement in the region of the brake pad 3 arranged on that side of the brake disk which is situated toward the outside of the vehicle. Said brake pad is therefore designed in a special way, as will be discussed in more detail below.

In FIG. 5, the brake pad 3 arranged on the brake disk side situated toward the outside of the vehicle is composed of the friction pad 4, which is designed for making contact with the brake disk, and the stable backplate 5. The latter is composed for example of cast steel, wherein the front side is formed as a fastening surface 16 for the friction pad 4, whereas the rear side 17 is formed as a pressure surface for the transmission of the brake pressure. This is because, by means of said rear side 17, the backplate 5 bears against a corresponding pressure-exerting surface 18 of the brake caliper 1. The surface 18 is simultaneously a wall of the pad channel 6.

The circumferential contour of the backplate 5 is defined by an upper or, with respect to the axis of rotation A, outer margin 21, an inner or lower margin 22 facing toward the axis of rotation A, and two side margins 23A, 23B, which extend between the upper and the lower margin and which run parallel to one another.

The upper or outer margin 21 is distinguished by a main profile which follows the shape of the brake disk. For this purpose, the upper margin 21 has predominantly, that is to say over the predominant part of its length, a circular-arc-shaped profile which assumes the circular shape at the circumference of the round brake disk. This has the advantage that the brake pad 3 does not project radially outward beyond the technically required circumference of the brake disk.

By means of the two side margins 23A, 23B, the backplate 5 is supported in a circumferential direction, such that the braking torques are transmitted to the brake caliper 1 or alternatively to a brake carrier, which is installed fixedly with respect to the axle, of the disk brake. The braking torques may also be transmitted to a lesser extent via the lower margin 22 of the backplate 5.

The friction pad 4 is also distinguished, at its upper or outer margin 31, by a main profile which follows the shape of the brake disk. For this purpose, the upper margin 31 has predominantly, that is to say over the predominant part of its length, a circular-arc-shaped profile which assumes the circular shape at the circumference of the round brake disk, whereby said margin also does not project radially outward beyond the circumference of the brake disk, but at the same time a maximum contact area between friction pad 4 and brake disk is available.

If the margins 21, 31 have a basically arcuate profile, this includes individual deviations from this main form. Accordingly, eccentrically in the friction pad 4 and backplate 5, there may be arranged a narrow recess 33 which serves for the local fastening of an electrical brake pad wear sensor. Furthermore, at the margin 21, individual small projections may be integrally formed without detriment to the arcuate main form of the margin, which projections may be advantageous for example in the context of the production of the brake pad.

To create space and a clearance for the cranked portion 11 of the hold-down means 7, the main profile of the upper margin 21 of the backplate 5 is interrupted, exactly in the center between the two side margins 23A, 23B, by a partial depression 25 of the margin 21. The depression 25 is wider than the width B of the downwardly cranked hold-down means section.

Therefore, only in the region of this depression 25, the height of the backplate 5 is radially reduced, with regard to the spacing to the axis of rotation A, such that, in the backplate 5, a clearance is realized through which at least a part of the cross section of the hold-down means 7 extends.

Likewise in order to create space for the hold-down means 7, the friction pad 4 also has a clearance in the same region. This is because, whereas the friction pad 4 otherwise runs in predominantly arcuate fashion at its outer margin 31, this primary form is also interrupted in the center between the two side margins 23A, 23B by a depression 35 of the upper margin 31. The depression 35 also leads, at the circumferential contour of the friction pad 4, to a clearance through which at least a part of the cross section of the hold-down means 7 extends. For this purpose, the depression 35 is wider than the width B of the downwardly cranked hold-down means section.

The base of the depression 25 in the backplate 5 is arranged lower, and thus closer to the axis of rotation A, than those sections 31A, 31B of the upper margin 31 of the friction pad 4 which directly adjoin the depression 35, formed in the friction pad 4, in the circumferential direction.

A clearance for the crossing of the hold-down means is thus realized by means of the depression 25. In this way, the hold-down means 7, over this part of its length, assumes a position radially less far to the outside, whereby the risk of brake parts grinding against the inside of the rotating vehicle wheel, such as arises owing to the structural constriction between the components of the disk brake and the vehicle wheel rotating around the brake, is reduced.

As per FIG. 5, a projection 40 is formed integrally on the rear side 17 of the backplate 5, below the upper margin 21 thereof. The projection 40 is arranged closer to the upper margin 21 than to the lower margin 22 of the backplate 5. Said projection is positioned centrally in the circumferential direction of the brake pad 3, that is to say has the same spacing to both side margins 23A, 23B. For the support thereof on a correspondingly designed surface of the brake caliper 1, said projection is equipped with at least one downwardly directed support surface 42 (FIG. 3c). Said support surface is at right angles to the rear side 17 of the backplate 5 and is supported on the bottom of a recess 38 (FIG. 4b) with which the brake caliper 1 is equipped.

Figure 4A:
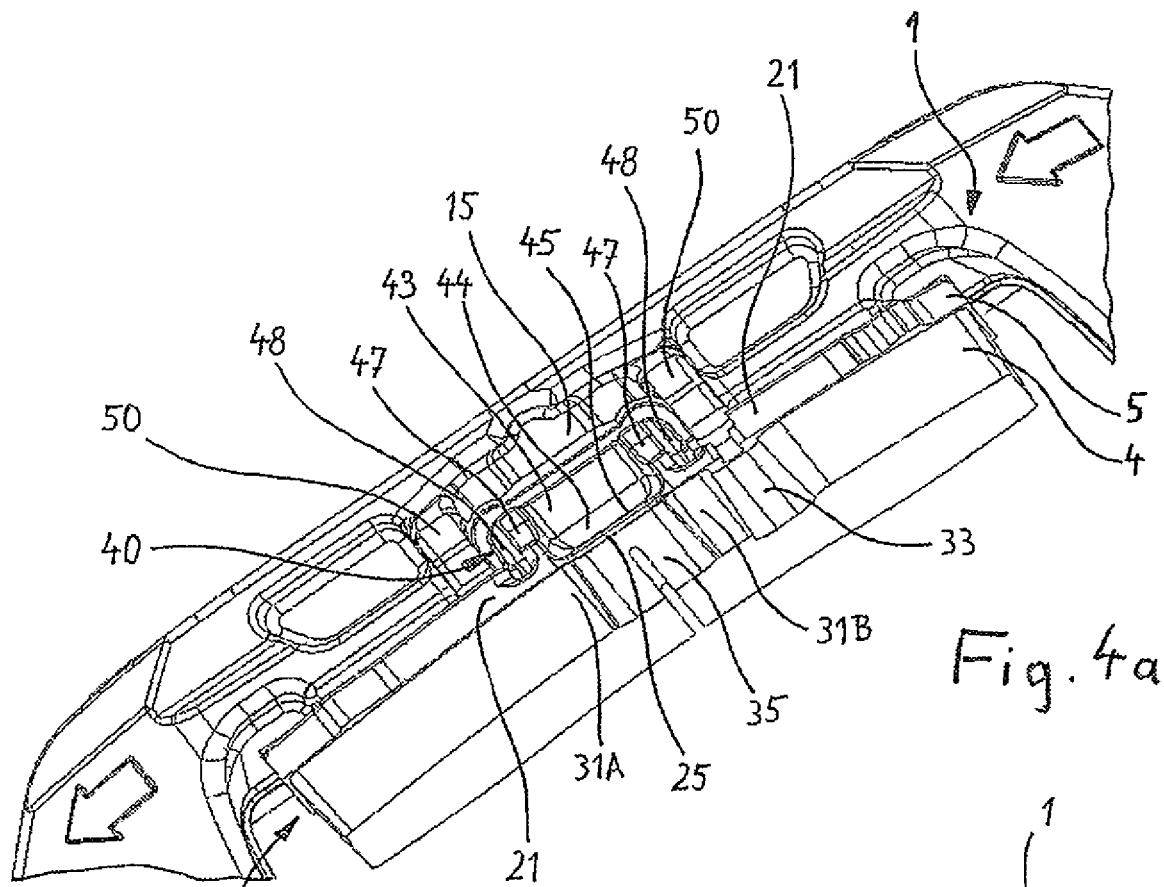
FIG. 4a shows the left-hand region of FIG. 2 on an enlarged scale.
Figure 4B:
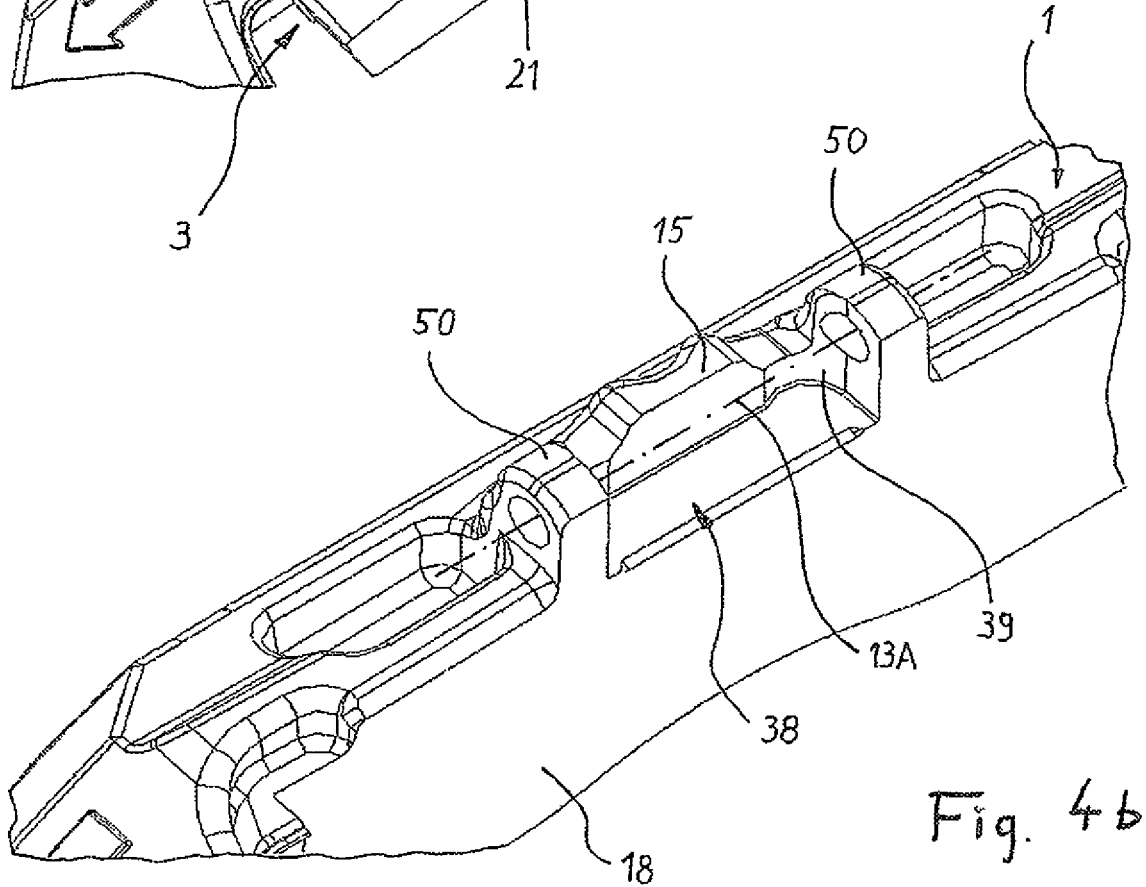
FIG. 4b shows the same region as FIG. 4a, but without a brake pad.

In a plan view from above, the projection 40 is of tetragonal outline. The two outer corners 41, spaced apart from the rear side 17, of the projection 40 are in each case rounded, with a corner radius R of in each case at least 4 mm. The rounding of the corners 41 has advantages in terms of production with regard to the cutting machining of the corresponding recess 38 in the brake caliper 1 (FIG. 4b). Said recess 38 serves as a pad receptacle in that it receives at least part of the projection 40 of the brake pad, and said recess is, for this purpose, equipped with correspondingly rounded internal corners 39 with a corner radius of at least 4 mm.

On the projection 40, facing away from the support surface 42, there is formed a flat hold-down means surface 43 with a width of 10 to 20 mm and a length or depth of at least 7 mm. The hold-down means surface 43 is arranged lower, and thus closer to the axis of rotation A, than the depression 25. It is only on the hold-down means surface 43 that the hold-down means 7 is supported against the brake pad, specifically by means of the underside, which forms a bearing surface 12A, of the short longitudinal section 12 following the cranked portion 11.

The longitudinal section 12 is simultaneously the end section of the hold-down means. The end face thereof is situated opposite a transverse wall of that recess 38 of the brake caliper 1 which at least partially receives the projection 40.

The hold-down means surface 43 for the contact of the hold-down means 7 is adjoined, toward the friction pad 4, by a relatively short transition surface 44. The transition surface 44 rises as far as the bottom of the depression 25, for example in the form of a bend or alternatively in the form of an oblique ramp. The transition surface 44 meets the bottom of the depression 25 at an edge 45, wherein, as per FIG. 3c, said edge 45 is arranged in a plane of the backplate 5, which plane is situated between the plane of the fastening surface 16 and the plane of the rear side 17.

The hold-down means surface 43 is adjoined laterally, that is to say as viewed in the circumferential direction of the brake pad, by in each case one marginal region 47 which projects beyond the hold-down means surface 43. That end section 12 of the hold-down means 7 which is supported on the hold-down means surface 43 is thus flanked by the two elevated marginal regions 47, whereby the hold-down means 7 has no or little lateral play in relation to the brake pad 3.

When the bracket 60 has been installed, it is not only a counterbearing element for the leaf spring 9 but is at the same time also a blocking element. This is because the marginal contours 64 of the lugs 63 form a stop which is not spaced apart, or spaced apart only to a small extent, from surfaces formed oppositely on the projection 40. This has the result that no or only little lift-off of the support surface 42 of the brake pad 3 from the brake caliper is possible. The stated blocking action is achieved in that, in each of the two marginal regions 47 of the projection 40, there is formed a channel 48 which forms the counterpart stop.

Viewed in the circumferential direction of the brake pad 3, the channels 48 are arranged in front of and behind the center of the backplate 5, wherein the spacings of said channels to said center are equal. Each channel 48 extends along the respective side surface 49 of the projection 40. The bottom of each channel 48 faces toward the bolt 13 and is situated opposite the respective contour 64 of the bracket 60 with a small spacing, or there is even permanent contact between the contour 64 and the bottom of the channel 48. If there is no permanent contact, the spacing is however in any case small, and in particular smaller than the spacing of the bolt 13 to the cranked portion 11 or to the end section 12 of the hold-down means 7.

The contours 64 on the bracket 60 which serves as blocking element therefore form in each case one stop, and the channels 48 on the brake pad 3 form in each case the counterpart stop. Therefore, if the brake pad 3 moves abruptly upward owing to intense vibrations, which leads to an equally great lift-off of the hold-down means 7 also, this movement is blocked at the latest when the channel 48 impacts against the contour 64. An even greater movement, which would then have to be absorbed entirely by the leaf spring 9, is prevented, and thus the service life of the leaf spring 9 is lengthened.

The channels 48 may, along one side thereof, specifically toward the respective side surface 49 of the projection 40, be of open form. The channels 48 may be open at their end averted from the backplate 5. Facing toward the backplate 5, said channels are of such a length that they extend not only over the depth of the projection 40 but also into the thickness of the backplate 5. It is thereby possible for the stop formed by the contour 64 of the side sections 63 to be situated close to the backplate 5. In this way, a tilting moment in the event of abutment against the brake pad 3 is minimized or even eliminated.

Figure 9A:
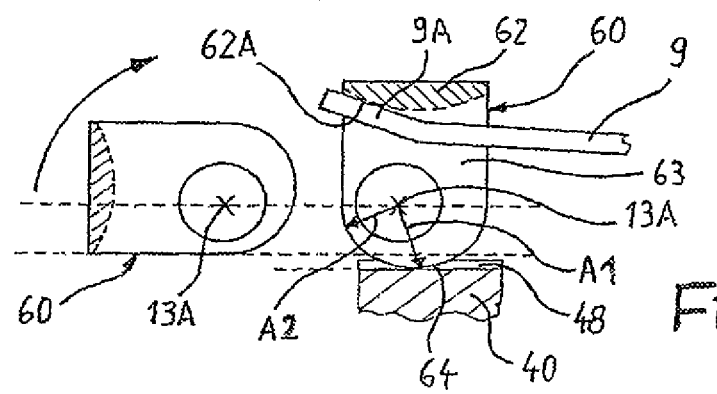
FIGS. 9a-9c show three different variants of the bracket and the interaction thereof with the brake pad.
Figure 9B:
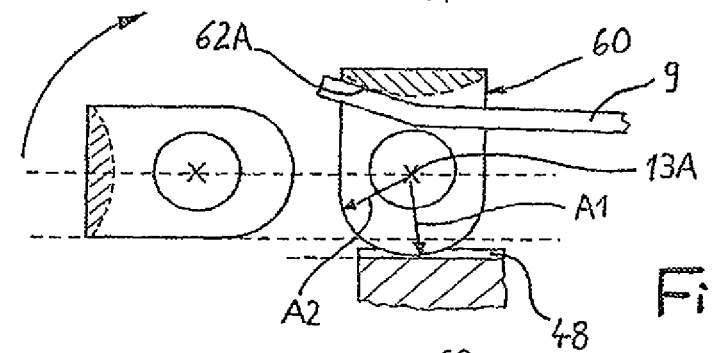
Figure 9C:
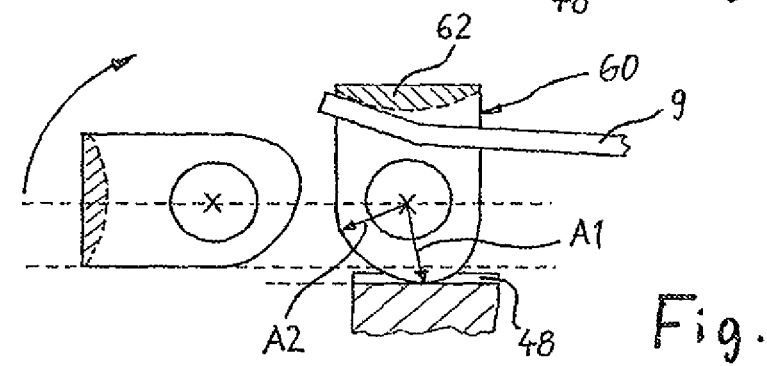

FIGS. 9a-9c show various possibilities for the design of the contours 64 of the bracket 60. Said designs have in common the fact that those margins of the lugs 63 which face away from the central section 62 of the bracket 60 have in each case a curved contour 64, the spacing A1, A2 of which to the axis 13 of the bolt changes along the contour 64. Here, that section of the curved contour 64 which has the greatest spacing A1 to the bolt axis also has the greatest spacing to the central section 62.

In FIG. 9a and FIG. 9b, the contour 64 has a semicircular curvature, wherein the radius central point of the curvature is situated offset with respect to the bolt axis 13A.

In FIG. 9c, the contour 64 is designed in the manner of a cam or eccentric. In this case, too, that section of the contour 64 which has the greatest spacing A1 to the bolt axis 13A is situated opposite the counterpart stop 48.

Figure 10:
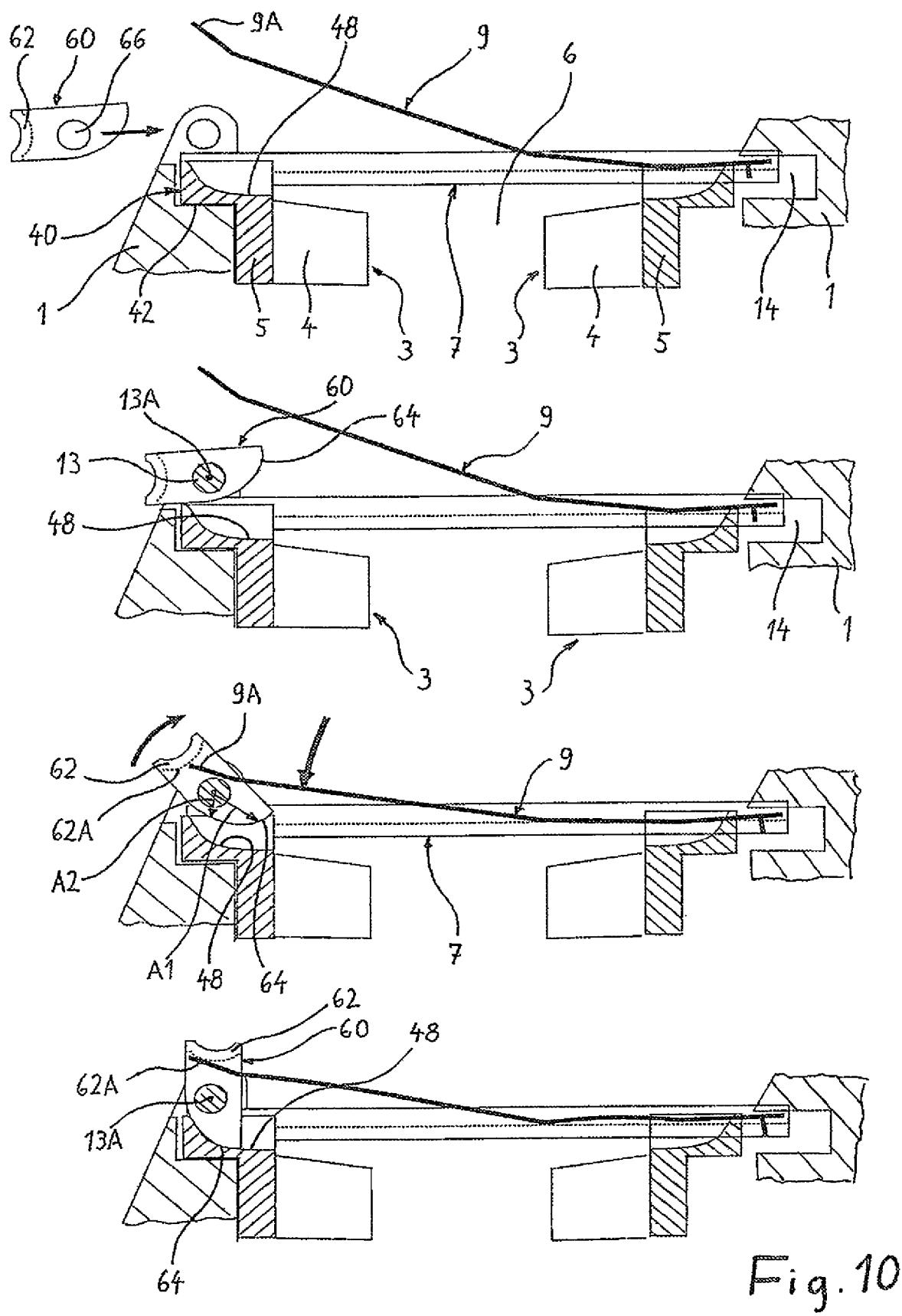
FIG. 10 shows the fastening of the leaf spring in four different steps.

FIG. 10 shows a further embodiment of the bracket 60, in this case in individual installation steps. The margins 64 formed on the bracket 60 again have a pronounced cam-like or eccentric-like design. That end 9A of the spring 9 which is situated toward the outside of the vehicle is fixed by virtue of the bracket 60, which has already been installed on the bolt 13, being pivoted by approximately 90° about the bolt axis 13A as per the pivot arrow. In this way, the end 9A of the spring passes under the counterbearing 62A situated on the central section 62 of the bracket. The bracket 60 in this case forms a blocking element which is held, with spring loading imparted by the supporting spring 9, in its blocking position shown at the bottom in FIG. 10.

Furthermore, the bracket 60 is acted on, by means of the spring 9 which is supported on the central section 62 of said bracket, with a pivoting force which seeks to move the stop 64 formed on the bracket toward the counterpart stop 48 formed on the brake pad. This is achieved in that the inner side, facing toward the bolt 13, of the central section 62 on which the counterbearing 62A is situated is curved. This leads to a force component which seeks firstly to secure the bracket 60 against a backward pivoting movement at all times, and seeks secondly to move the stop 64 formed thereon toward the counterpart stop 48 at all times. The stop 64 bears against the counterpart stop 48 under spring force, such that the brake pad 3 bears against the brake caliper 1 with a force acting in a radial direction and/or in a direction pointing axially away from the brake disk.

FIGS. 9a-9c also show a similar design of the central section 62 of the bracket 60, in the case of which the counterbearing 62A has a curved profile, such that a backward pivoting movement of the bracket 60 counter to the pivoting arrow is practically ruled out. In this case, there is no need for additional positively locking securing of the spring end against the bracket 60.

At the side situated toward the inside of the vehicle, too, the hold-down means 7 is spaced apart only to a small extent from the leaf spring 9, which is supported in the slot-like recess 14 on the brake caliper. Thus, the inner of the two brake pads can also lift off only slightly from its radial support surface owing to the action of the hold-down means 7.

Altogether, it is achieved that the two pads 3 are held radially with respect to the brake disk axis A by means of spring force, and that, in the event of a lift-off of one or both brake pads 3, the travel in this regard is tightly limited by stops and counterpart stops.

As per FIG. 6 and FIG. 7, the hold-down means 7 is, at its other end which is situated toward the inside of the vehicle and by means of which said hold-down means is supported from above on the backplate of the inner brake pad, designed so as to realize support of said hold-down means end against the brake caliper 1 in the circumferential direction. For this purpose, the hold-down means 7 is at this end equipped with a central section 70, which extends on its longitudinal central line M and which forms a continuation of the base 7C, and with in each case one side section 71 or 72 to each side of the central section 70. The side sections 71, 72 are situated as an elongation of the side flanks 8A, 8B of the hold-down means section formed as a channel, and said side sections have, viewed in the longitudinal direction of the hold-down means, an upwardly bent, hook-like profile toward their ends. As a result, an inner surface 77 arranged above the plane of the base 7C is formed on each side section 71, 72.

For the purposes of support against counterpart surfaces 81 formed on the brake caliper 1, the two inner surfaces 77 face toward one another such that a clearance is situated between them. The support on the counterpart surfaces 81 may be realized without play, or may be realized with lateral play delimited in the circumferential direction of the brake disk.

To produce the bent side sections 71, 72 by deformation of the sheet steel plate of which the hold-down means 7 is composed, the side sections 71, 72 are in each case separated from the central section 70 by means of a longitudinal slot 73, 74, which is open only towards the closest end of the hold-down means. Only the central section 70 projects into the slot 14, whereas the side sections 71, 72 are situated outside the slot.

For the support of the inner surfaces 77 in the circumferential direction of the brake pads, the corresponding counterpart surfaces 81, which face away from one another, are formed on the brake caliper 1 above or alternatively below the slot 14 (FIG. 2).

Figure 11:
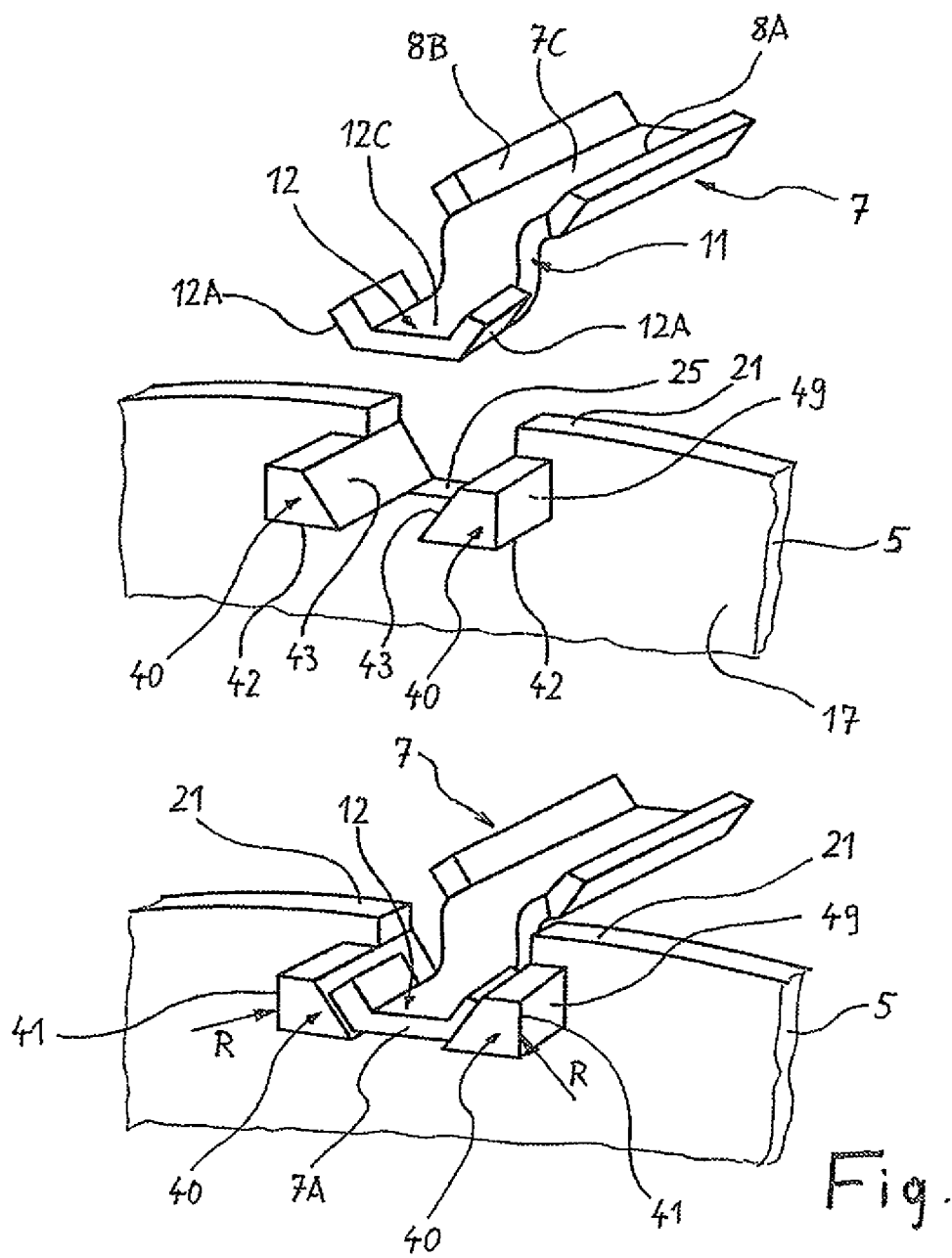
FIG. 11 shows another embodiment of the hold-down means and of the brake pad.

FIG. 11 shows a different design firstly of the hold-down means 7 and secondly of the projection formed integrally on the backplate 5 of the brake pad. Said projection is in this case formed in two parts, with a clearance existing between the two partial projections 40. The two projections or partial projections 40 are in each case equipped with a hold-down means surface 43 which is angled obliquely with respect to the support surface 42 on the bottom side thereof, wherein the two hold-down means surfaces 43 together form a "V". The angle of the hold-down means surfaces 43 with respect to the respective support surface 42 amounts to between 30° and 60°.

In the case of this two-part embodiment of the projection 40, too, said projection is formed integrally on the backplate below the upper margin 21 of the backplate 5.

In plan view, the two projections 40 together describe a substantially tetragonal outline, wherein the two outer corners 41, spaced apart from the rear side 17 of the backplate 5, of said outline are rounded, with corner radii R of at least 4 mm. In this way, these projections 40, too, fit into the recess 38 of the brake caliper 1 that are shown in FIG. 4b.

For the purposes of adaptation to the two projections 40, the depressed end section 12 of the hold-down means 7 is composed of a base 12C adjoining the cranked portion 11 and of flanks which rise obliquely to both sides of the base 12C. The undersides of said obliquely rising flanks form in each case one bearing surface 12A, by means of which the hold-down means 7 is supported on the brake pad. These in turn are the only locations at which the hold-down means 7 is supported on the brake pad 3.

LIST OF REFERENCE CHARACTERS

1 Brake caliper
3 Brake pad
4 Friction pad
5 Backplate
6 Pad channel
7 Hold-down means
7A Face end
7B Recess
7C Base
8A Side flank
8B Side flank
9 Spring, leaf spring
9A End of the leaf spring
9C Kink
10 Opening
11 Cranked portion
11A Bend
11B Bend
11C Straight-running section
11D Stiffening bead
12 Longitudinal section, end section of the hold-down means
12A Bearing surface
12C Base
13 Bolt
13A Axis, alignment axis
14 Slot, recess
15 Projection
16 Fastening surface
17 Rear side
18 Surface
21 Upper margin
22 Lower margin
23A Marginal edge
23B Marginal edge
25 Depression in the backplate
31 Upper margin
31A Section
31B Section
33 Recess
35 Depression in the friction pad
38 Recess in the brake caliper
39 Internal corner
40 Projection
41 Corner
42 Support surface
43 Hold-down means surface
44 Transition surface
45 Edge
47 Marginal region
48 Channel
49 Side
50 Bearing block
60 Bracket, counterbearing element, blocking element
61 Opening
62 Central section
62A Counterbearing
63 Side section, lug
64 Contour, stop
66 Opening
70 Central section
71 Side section
72 Side section
73 Longitudinal slot
74 Longitudinal slot
77 Inner surface
81 Counterpart surface on the brake caliper
A Axis of rotation of the disk brake
A1 Spacing
A2 Spacing
B Width L Length of the end section
M Longitudinal central line
R Corner radius

What is claimed is:

1. A brake pad for a disk brake, which brake pad is composed of a friction pad (4), which is designed to make contact with the brake disk of the disk brake, and of a backplate (5), the front side of which is formed as a fastening surface (16) for the friction pad (4) and the rear side (17) of which is formed as a pressure surface for the transmission of the brake pressure, wherein the circumferential contour of the backplate (5) is defined by an upper margin (21), a lower margin (22) and two side margins (23A, 23B) extending between the upper and the lower margin, and also the circumferential contour of the friction pad (4) is defined by an upper margin (31), a lower margin and two side margins extending between the upper and the lower margin, and wherein the upper margins (21 and 31 respectively) of the backplate (5) and of the friction pad (4) each have a main profile which is interrupted, in the center between the two side margins (23A, 23B) of the backplate (5), by a depression (25 and 35 respectively) of the upper margin (21 and 31 respectively) in the direction of the lower margin (22) of the backplate (5), wherein, on the rear side (17) of the backplate (5), a projection (40) is integrally formed, wherein the projection (40) projects away from the rear side (17) in a direction facing away from the front side, wherein the projection (40)
- is arranged closer to the upper margin (21) than to the lower margin (22) of the backplate (5), and/or
- is equipped, for the purposes of support in a pad receptacle, with a support surface (42) facing toward the lower margin (22), and/or
- is equipped with a hold-down surface (43) which faces away from the support surface (42) and which is arranged lower than the depression (25) in the backplate (5).

2. The brake pad as claimed in claim 1, wherein the projection (40) is, in plan view, of substantially tetragonal outline, wherein the two corners (41) spaced apart from the rear side (17) of the backplate (5) are rounded, with corner radii (R) of at least 4 mm.

3. The brake pad as claimed in claim 1, wherein the width of the projection (40) is equal to or greater than the width of the depression (25) in the backplate (5).

4. The brake pad as claimed in claim 1, wherein the hold-down surface (43) is at right angles to the plane of the rear side (17).

5. The brake pad as claimed in claim 1, wherein the hold-down surface (43) is arranged centrally between the two side margins (23A, 23B), and wherein the hold-down surface (43) is delimited laterally in each case by a side margin (47).

6. The brake pad as claimed in claim 5, wherein an upwardly open shell (48) is formed in each of the two side margins (47).

7. The brake pad as claimed in claim 6, wherein the upwardly open shells (48) extend as far as into the backplate (5).

8. The brake pad as claimed in claim 5, wherein the width of the hold-down surface (43) between the two side margins (47) amounts to between 10 and 20 mm, and wherein the length of the hold-down surface (43) amounts to at least 7 mm.

9. The brake pad as claimed in claim 1, comprising a transition surface (44) which adjoins the hold-down surface (43) in the direction of the friction pad (4) and which rises toward the depression (25).

10. The brake pad as claimed in claim 9, comprising an edge (45) at which the transition surface (44) meets the depression (25).

11. The brake pad as claimed in claim 10, wherein the edge (45) is situated in a plane which is situated between the plane of the fastening surface (16) and the plane of the rear side (17).

12. The brake pad for a disk brake as claimed in 30, wherein the bottom of the depression (25) in the backplate (5) is arranged lower than those sections (31A, 31B) of the upper margin (31) of the friction pad (4) which adjoin the depression (35) in the friction pad (4) in a circumferential direction.

13. A brake pad for a disk brake, which brake pad is composed of a friction pad (4), which is designed to make contact with the brake disk of the disk brake, and of a backplate (5), the front side of which is formed as a fastening surface (16) for the friction pad (4) and the rear side (17) of which is formed as a pressure surface for the transmission of the brake pressure and the circumferential contour of which is defined by an upper margin (21), which runs in predominantly circular-arc-shaped fashion, a lower margin (22), and two side margins (23A, 23B) extending between the upper and the lower margin, and wherein the circular arc shape of the upper margin (21) is interrupted, in the center between the two side margins (23A, 23B), by a depression (25) of the upper margin (21) in the direction of the lower margin (22), wherein, on the rear side (17) of the backplate (5), a projection (40) is integrally formed, wherein the projection (40) projects away from the rear side (17) in a direction facing away from the front side, wherein the projection (40)
- is arranged closer to the upper margin (21) than to the lower margin (22) of the backplate (5), and/or
- is equipped, for the purposes of support in a pad receptacle, with a support surface (42) facing toward the lower margin (22), and/or
- is equipped with a hold-down surface (43) which faces away from the support surface (42) and which is arranged lower than the depression (25) in the backplate (5);

wherein the friction pad (4) has an upper margin (31) which runs in predominantly circular-arc-shaped fashion, and wherein the circular arc shape is interrupted, in the center between the two side margins (23A, 23B), by a depression (35) of the upper margin (31).

14. The brake pad for a disk brake as claimed in 42, wherein the bottom of the depression (25) in the backplate (5) is arranged lower than those sections (31A, 31B) of the upper margin (31) of the friction pad (4) which adjoin the depression (35) in the friction pad (4) in a circumferential direction.

15. A disk brake having a brake caliper (1) which engages over a brake disk (2) and over brake pads (3) arranged to both sides of said brake disk, which brake pads are each composed of a friction pad (4) and of a backplate (5), wherein the circumferential contour of the backplate (5) of the brake pad which is arranged further toward the outside of the vehicle is defined by an upper margin (21), a lower margin (22) and two side margins (23A, 23B) extending between the upper and the lower margin, and also the circumferential contour of the friction pad (4) is defined by an upper margin (31), a lower margin and two side margins extending between the upper and the lower margin, and wherein a hold-down means (7) with a longitudinal extent and a width much smaller than said longitudinal extent leads transversely across the brake pads (3), is supported, toward the disk brake axis (A), against the brake pads, has, over the predominant part of its overall length, a flat base (7C) adjoined by side flanks (8A, 8B) arranged at an angle with respect to said base, and has, over another part of its overall length, an end region with a different cross-sectional form, wherein:

the end region is formed by an S-shaped cranked portion (11) adjoining the base (7C) and by a straight longitudinal section (12) adjoining the cranked portion (11), the straight longitudinal section (12) has a bearing surface (12A) which runs parallel to and spaced apart from the base (7C), the main profile of the upper margins (21 and 31 respectively) of the backplate (5) and of the friction pad (4) is interrupted, where the hold-down means (7) leads across the brake pad (3), by a depression (25 and 35 respectively) of the upper margin (21 and 31 respectively) in the direction of the brake disk axis (A), and the depressions (25 and 35 respectively) are wider than the width (B) of the downwardly cranked hold-down means section.

16. The disk brake as claimed in claim 15, wherein the bottom of the depression (25) in the backplate (5) is arranged lower than those sections (31A, 31B) of the upper margin (31) of the friction pad (4) which adjoin the depression (35) in the friction pad (4) in a circumferential direction.

17. The disk brake as claimed in claim 15, wherein, on the rear side (17) of the backplate (5), a projection (40) is integrally formed which
is supported, by a support surface (42) facing toward the axis of rotation (A) of the disk brake, against the brake caliper (1), and/or
is equipped with a hold-down surface (43) which faces away from the support surface (42) and which is arranged lower than the depression (25) in the backplate (5), wherein the hold-down means (7) is supported on the hold-down surface (43).

18. The disk brake as claimed in claim 15, comprising a leaf spring (9) which bears resiliently against that side of the hold-down means (7) which faces away from the brake pads (3), that end (9A) of which leaf spring which is situated toward the outside of the vehicle is fixed relative to the brake caliper (1) by a bolt (13).

19. A disk brake having a brake caliper (1) which engages over a brake disk (2) and over brake pads (3) arranged to both sides of said brake disk, which brake pads are each composed of a friction pad (4) and of a backplate (5), wherein the circumferential contour of the backplate (5) of the brake pad which is arranged further toward the outside of the vehicle is defined by an upper margin (21), which runs in predominantly circular-arc-shaped fashion, a lower margin (22), and two side margins (23A, 23B) extending between the upper and the lower margin, and wherein a hold-down means (7) with a longitudinal extent and a width much smaller than said longitudinal extent leads transversely across the brake pads (3), is supported, toward the disk brake axis (A), against the brake pads, has, over the predominant part of its overall length, a flat base (7C) adjoined by side flanks (8A, 8B) arranged at an angle with respect to said base, and has, over another part of its overall length, an end region with a different cross-sectional form, wherein:

the end region is formed by an S-shaped cranked portion (11) adjoining the base (7C) and by a straight longitudinal section (12) adjoining the cranked portion (11), the straight longitudinal section (12) has a bearing surface (12A) which runs parallel to and spaced apart from the base (7C), the circular arc shape of the upper margin (21) of the backplate (5) is interrupted, where the hold-down means (7) leads across the brake pad (3), by a depression (25) of the upper margin (21) in the direction of the disk brake axis (A), and the depression (25) is wider than the width (B) of the downwardly cranked hold-down means section.

20. The disk brake as claimed in claim 19, wherein the friction pad (4) has an upper margin (31) which runs in predominantly circular-arc-shaped fashion, and wherein the circular arc shape is interrupted, where the hold-down means (7) leads across the brake pad (3), by a depression (35) of the upper margin (31).

21. The disk brake as claimed in claim 19, wherein the bottom of the depression (25) in the backplate (5) is arranged lower than those sections (31A, 31B) of the upper margin (31) of the friction pad (4) which adjoin the depression (35) in the friction pad (4) in a circumferential direction.

22. The disk brake as claimed in claim 19, wherein, on the rear side (17) of the backplate (5), a projection (40) is integrally formed which
is supported, by a support surface (42) facing toward the axis of rotation (A) of the disk brake, against the brake caliper (1), and/or
is equipped with a hold-down surface (43) which faces away from the support surface (42) and which is arranged lower than the depression (25) in the backplate (5), wherein the hold-down means (7) is supported on the hold-down surface (43).

23. The disk brake as claimed in claim 22, wherein the hold-down surface (43) is arranged centrally between the two side margins (23A, 23B), and in that the hold-down surface (43) is delimited laterally in each case by a side margin (47), such that an end section (12) of the hold-down means (7) is flanked by the side margins (47).

24. The disk brake as claimed in claim 22, comprising a transition surface (44) which adjoins the hold-down surface (43) in the direction of the friction pad (4) and which rises toward the depression (25).

25. The disk brake as claimed in claim 19, comprising a leaf spring (9) which bears resiliently against that side of the hold-down means (7) which faces away from the brake pads (3), that end (9A) of which leaf spring which is situated toward the outside of the vehicle is fixed relative to the brake caliper (1) by a bolt (13).

26. The disk brake as claimed in claim 25, wherein the bolt (13) is arranged between those ends of the hold-down means (7) which are situated toward the outside of the vehicle and the leaf spring (9).

27. The disk brake as claimed in claim 26, wherein the end (9A) of the leaf spring (9) which is situated toward the outside of the vehicle bears resiliently against a bracket (60) which is fastened on the bolt (13) is to be pivotable about the axis (13A) thereof.

28. A hold-down means (7) for the fastening of brake pads in a disk brake, having a longitudinal extent and having a width which is much smaller in relation to said longitudinal extent, wherein the hold-down means (7) is formed, over the predominant part of its overall length, as a flat base (7C) adjoined by side flanks (8A, 8B) arranged at an angle with respect to said base, and has, over another part of its overall length, an end region with a different cross-sectional form, wherein:

the end region is formed by an S-shaped cranked portion (11) adjoining the base (7C) and by a straight longitudinal section (12) adjoining the cranked portion (11), the straight longitudinal section (12) has a bearing surface (12A) which runs parallel to and spaced apart from the base (7C), and the region of the cranked portion (11) is reinforced by one or more stiffening beads (11D).

29. The hold-down means as claimed in claim 28, wherein the S-shaped cranked portion (11) is a single cranked portion composed of a first bend (11A) and a second bend (11B) opposite to the first bend, wherein the second bend (11B) is simultaneously the final bend, which is directly adjoined by the straight longitudinal section (12).

30. The hold-down means as claimed in claim 28, comprising a straight-running section (11C) between the two bends (11A, 11B).

31. The hold-down means as claimed in claim 29, wherein the straight longitudinal section (12) extends parallel to and offset with respect to the base (7C).

* * * * *